Figures 1, 2:
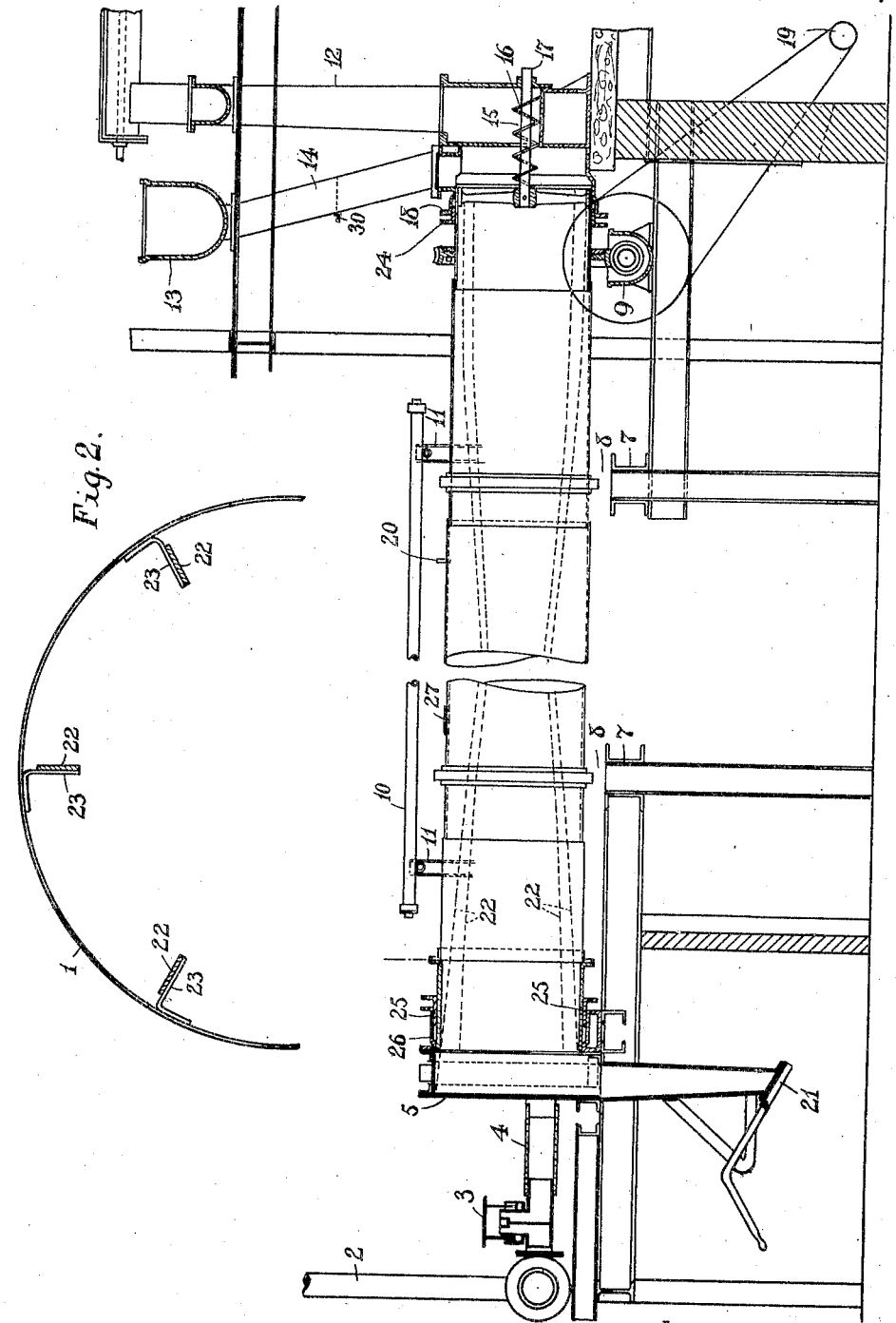

A. RUDGE.
MANUFACTURE OF BLEACHING POWDER.
APPLICATION FILED MAR. 25, 1919.

1,330,495.

Patented Feb. 10, 1920.

Inventor
Alfred Rudge,
By Rudge and Sons
Asso. Attorneys.

UNITED STATES PATENT OFFICE.

ALFRED RUDGE, OF GATESHEAD, ENGLAND.

MANUFACTURE OF BLEACHING-POWDER.

1,330,495.　　　　　Specification of Letters Patent.　　Patented Feb. 10, 1920.

Application filed March 25, 1919. Serial No. 285,019.

*To all whom it may concern:*

Be it known that I, ALFRED RUDGE, a subject of the King of Great Britain, residing at Gateshead, in the county of Durham and Kingdom of England, have invented certain new and useful Improvements in the Manufacture of Bleaching-Powder, of which the following is a specification.

This invention relates to improvements in the manufacture of bleaching powder, hereafter termed for brevity, bleach, and the object of the invention is to provide a process whereby it is possible to manufacture bleach in a single stage continuous operation. The object of the invention is further to provide a process whereby high-strength chlorin can be used if desired and whereby a high-strength bleach can be produced from chlorin gas of practically any strength with absolutely complete absorption. A further object is to provide a process in which the material is prevented from corroding the containing vessel and in which the material is discharged ready for packing at a suitable temperature. A further object is to provide an apparatus which is suitable for effecting this process although it may also be employed for other appropriate cases of interaction between gases and solids.

The invention includes various details and constructional features as will be apparent from the following description and the scope of the invention will be clearly defined in the claims. The invention will be described by way of example with reference to the accompanying drawings, in which:—

Figure 1 is a longitudinal section broken away through the middle while Fig. 2 is a cross section through the upper part of the cylinder at the smaller stroke.

In the drawings, 1 is a cylinder about 60 feet long and 3 feet in diameter built of thin mild steel plates. The cylinder is supported by a roller 8 carried on bearings in supports 7. The rotation of the cylinder is effected by a worm or spur gear 9 driven from a motor 19. The ends of the cylinder are provided with truly turned faces 24 and 25 which rotate within similar faces 18 and 26 carried by fixed cylindrical members. Stuffing boxes and glands may be employed to prevent escape of gas.

The chlorin gas enters by the main 2, passing through the valve 3 and the flexible rubber pipe 4 which is provided for the purpose of counteracting vibration. This pipe may be clipped if desired. The chlorin gas passes through the cylinder and the residual inert gas is taken away through the pipe 14 by means of draft induced by fan or other means 13; a damper 30 serves for control.

The lime is introduced through the pipe 12 and fed into the cylinder through the tubular member 15 within which the screw 16 is rotated by means of the shaft 17 which is suitably driven by means not shown.

The lime is removed at the other end of the cylinder through the fixed part 5 which is provided with double slides 21 for the purpose of preventing escape of gas.

The cylinder is cooled by water in the form of a spray which is introduced through the pipe 10 and the smaller pipes 11 provided with suitable valves so that all or any of the pipes 11 may be shut off if desired.

Suitable openings are provided for the reception of the thermometers 20 and inspection holes 27 are also provided. The material is agitated by six beaters within the cylinder, each of which is spirally arranged to make one or more complete revolutions in the length of the cylinder. These beaters 22 are formed of thin strip iron and are spaced apart from the internal wall of the cylinder by L-shaped lugs 23 arranged about three feet apart. In operation especially with high-strength chlorin, the cylinder is externally cooled by water spray for about three quarters of its length, and consequently the temperature of reaction is prevented from rising too high, injurious corrosion of the cylinder is prevented and the material is discharged at a temperature which is suitable for packing. The features which have been enumerated are all of importance in contributing to this result. It is necessary that the cylinder should be relatively long in order to allow sufficient time for the reaction and to prevent local overheating. In order to effect efficient cooling, it is necessary to provide thin metal walls for the cylinder and it is of especial importance to provide means for preventing the adherence of the materials to the interior walls of the cylinder. Especially at the intermediate stages of the process, the material assumes a slightly sticky consistency, and it is for this reason that it is necessary to provide the lifters which are spaced apart from the interior of the cylinder, for instance, by the L-shaped lugs. The effect of the spaced lifters is to lift the material positively within a thin partial annular zone not immediately adjacent the walls of the cylinder; the inner and outer radii of said zone correspond with the distances from the center of the inner and outer edges of the lifters 22. The zone is only a partial annulus because lifting only occurs through part of each revolution. In practical operation it is necessary to supplement the action of the lifters by periodically vibrating the cylinder and this is best performed by arranging for the outside of the cylinder to be manually or mechanically struck periodically at intervals along its length when it is found that the material is detached from the interior wall in a satisfactory manner.

I declare that what I claim is:—

1. A one-stage continuous process of manufacturing high-strength bleach in which lime and chlorin gas are caused to move relatively in counter-current through a very long cylindrical space with external cooling, in which space the solid is agitated and at the same time prevented from adhering to the containing surfaces by being positively lifted within a thin partial annular zone not immediately adjacent to the containing surface of the cylindrical space.

2. A one-stage continuous process of manufacturing high-strength bleach in which lime and chlorin gas are caused to move relatively in counter-current through a very long cylindrical space confined within thin walls adapted to allow ready thoroughfare of heat with external cooling, while the solid is agitated and at the same time prevented from adhering to the containing surfaces.

3. A one-stage continuous process of manufacturing high-strength bleach in which chlorin gas is passed in counter-current to lime through a very long cylindrical space in which the solid is agitated and prevented from adhering to the containing surfaces, with external cooling after the earliest part of the reaction.

4. A one-stage continuous process of manufacturing high-strength bleach in which chlorin gas is passed in countercurrent to lime through a very long cylindrical space in which the solid is lifted and allowed to fall in planes parallel with the axis of the cylindrical space in such manner as not to adhere to the containing surfaces, external cooling being provided during the latter part of the reaction.

5. A one-stage continuous process of manufacturing high-strength bleach in which lime and chlorin are caused to move relatively in counter current through a very long cylindrical space in which the solid is agitated by being lifted and allowed to fall within said space and in which the containing surfaces are vibrated to prevent adherence of the solid thereto.

6. A one-stage continuous process of manufacturing high-strength bleach in which lime and chlorin gas are caused to move relatively in counter-current through a very long cylindrical space in which the solid is agitated by being lifted and allowed to fall and in which the exterior of the containing surface is knocked at intervals to assist in preventing adherence.

In witness whereof, I have hereunto signed my name this 28th day of February, 1919, in the presence of two subscribing witnesses.

ALFRED RUDGE.

Witnesses:
 ALICE HUTCHINSON,
 ROBERT F. FREER.